2,871,873

Patented Feb. 3, 1959

2,871,873

LIQUID LEVEL CONTROL VALVE WITH PRE-CHECK SYSTEM

Malcolm M. McQueen, Hollywood, Calif., assignor to Whittaker Controls, a Division of Telecomputing Corporation, Los Angeles, Calif., a corporation of California Application January 31, 1958, Serial No. 712,398

19 Claims. (Cl. 137—390)

This invention relates to a liquid level controlling valve means for service in filling tanks and the like, with special reference to such a valve means that opens in response to the pressure of the supply liquid and closes automatically in response to the filling of the tank. The invention is directed specifically to provisions for pre-checking the operative responsiveness of the valve means in the course of a filling operation to make sure that the valve will automatically cut off the supply liquid when the tank is full.

The invention is broadly applicable for its purpose in various fields but has special utility as valve means for controlling the flow of liquid fuel into a fuel tank of an aircraft either during flight or when the aircraft is on the ground. Such an embodiment of the invention has been selected for the present disclosure and will provide adequate guidance for those skilled in the art who may have occasion to apply the same principles to other specific purposes.

An aircraft that is adapted for refueling during flight has a fuel duct or manifold that leads from a probe on the nose of the aircraft to a number of separate fuel tanks. The manifold is used not only for refueling operations but also to convey fuel from the different fuel tanks to the engine or engines of the aircraft.

A normally closed valve means for each fuel tank opens automatically in response to the fuel pressure in the manifold to admit the fuel into the tank and closes automatically when the tank is full. Failure of the automatic valve means to close is a serious matter since the fuel is supplied to an aircraft in flight at rates as high as 600 gallons per minute and at pressures of 50 p. s. i. or higher. Malfunctioning of the valve means may result in bursting of the fuel tank, or the dumping of fuel overboard, or in the creation of dangerously high pressure surges in the fuel line. On the other hand, if such a valve means opens inadvertently during flight when a refueling operation is not in process, the result may be pumping of fuel into an empty fuel tank instead of pumping fuel to the engine or engines to keep the aircraft in flight.

A well-known type of such a valve means comprises a main fuel valve and two pilot valves, each of which closes in response to the rise of the fuel in the tank to a predetermined level in an upper zone of the tank. The main fuel valve opens in response to the pressure of the supply fuel and closes automatically in response to operation of either of the two pilot valves. The automatic action is accomplished by providing a diverter passage means to convey a portion of the inflowing fuel to the two pilot valves and the main fuel valve closes in response to a rise in the back pressure in the diverter passage means whenever either of the two pilot valves closes.

Such an arrangement is fail-safe only in the limited sense that if one of the two pilot valves fails to function, the other pilot valve causes the main valve to close. It is a serious drawback, however, that there is no provision for ascertaining whether or not one of the pilot valves fails. Thus if one of the two pilot valves should become defective, the main valve still closes automatically when the tank fills but the fail-safe feature is lost without any warning of the loss.

It has also been proposed heretofore to combine a single pilot valve with a main valve and to provide means for pre-checking the operation of the pilot valve. The single pilot valve is operated by a float on an arm and remotely controlled means is provided to lift the float arm to cause the pilot valve to close and thereby close the main valve. The remotely controlled means is operated in the course of a fueling operation to provide a pre-check to make sure that the main valve will close automatically when the tank is full. Whether or not the pre-check operation results in closing of the main valve is ascertained by reference to a flow meter in the fuel line.

The last described valve arrangement is not fail-safe, not even to the extent of providing two independent pilot valves for controlling the main valve. Moreover, the pre-checking operation is not reliable since it would indicate perfect functioning if the float were full of liquid and even if the float were broken away from the control arm. It is to be further noted that the pre-check operation gives no indication of whether the malfunctioning is in the pilot valve or is in the main valve.

The present invention meets these problems by employing a valve assembly comprising two float actuated pilot valves and a main valve in combination with certain additional provisions. One provision makes it possible to form small test bodies of fuel to act on the two pilot valve floats selectively for pre-checks during a fueling operation. The test bodies of fuel are created by releasing a portion of the fuel in an upper zone of the tank and by providing two traps that are operative to collect the released fuel in the regions of the actuating floats of the two pilot valves respectively. Another provision is a normally closed fail-safe safety cut-off valve to prevent flow through the main valve between fueling operations. Preferably a further provision is a signal means to indicate whether or not the main valve closes.

The invention is further characterized by the concept of providing two independent remote control means for pre-checking the operativeness of the valve assembly. One of the two remotely controlled pre-check means is effective to operate one of the two traps and at the same time to open or hold open the safety shut-off valve. The other of the two remotely controlled pre-check means is effective to operate the other of the two traps and at the same time also to open or hold open the safety shut-off valve.

The two remotely controlled pre-check means may be mechanical mechanisms or may be either pneumatic or hydraulic systems. In the preferred practice of the invention, however, the two remotely controlled pre-check means are two normally open electric circuits. One of the two pre-check circuits includes electromagnetic means to open one of the two traps together with electromagnetic means to open or hold open the safety shut-off valve. The other of the two circuits includes electromagnetic means to open the other of the two traps together with a second electromagnetic means to open or hold open the safety shut-off valve. Thus only two pre-check signals are required and only three wires are needed for the two pre-check circuits.

To carry out a fueling operation both of the pre-check circuits are closed to cause the safety shut-off valve to open and to cause both of the liquid-collecting traps to open. When the fuel level in the tank reaches either of the two pilot valves, the pilot valve closes and then the main valve promptly closes in response to the closing of the pilot valve.

To test the operativeness of the valve assembly in the course of a fueling operation and before the tank is completely full, a pre-check procedure of three successive steps may be followed. The first step is to de-energize one of the two pre-check circuits to cause one of the two traps to close. The closing of the trap results in collecting the liquid fuel that is released in the upper zone of the tank thereby to form a small test body of liquid to cause the corresponding pilot valve to close by lifting the float of the valve. The closing of the pilot valve causes the main valve to close and a signal means indicates the closing of the main valve.

The pre-check circuit that is opened for this first pre-check step is now closed to resume the fueling operation and then the second pre-check step is carried out by opening the second pre-check circuit. Opening of the second pre-check circuit closes the second trap to cause the second pilot valve to close with consequent closing of the main valve as indicated by the signal means.

If operation of the signal means by these two pre-check steps indicates that the two pilot valves and the main valve are functioning properly, the third pre-check step may be taken by resuming the fueling operation and then simultaneously opening both of the pre-check circuits while the tank is still only partially full. If the indicator lamp flashes on immediately it indicates that the safety shut-off valve is functioning properly. If there is a delay, however, as required for the accumulation of a test body of fuel in one of the traps to operate a pilot valve, the safety shut-off valve is not functioning as it should.

The various features, objects and advantages of the invention may be understood from the following detailed description taken with the accompanying drawings.

In the drawings, which are to be regarded as merely illustrative:

*General arrangement*

Figure 1:
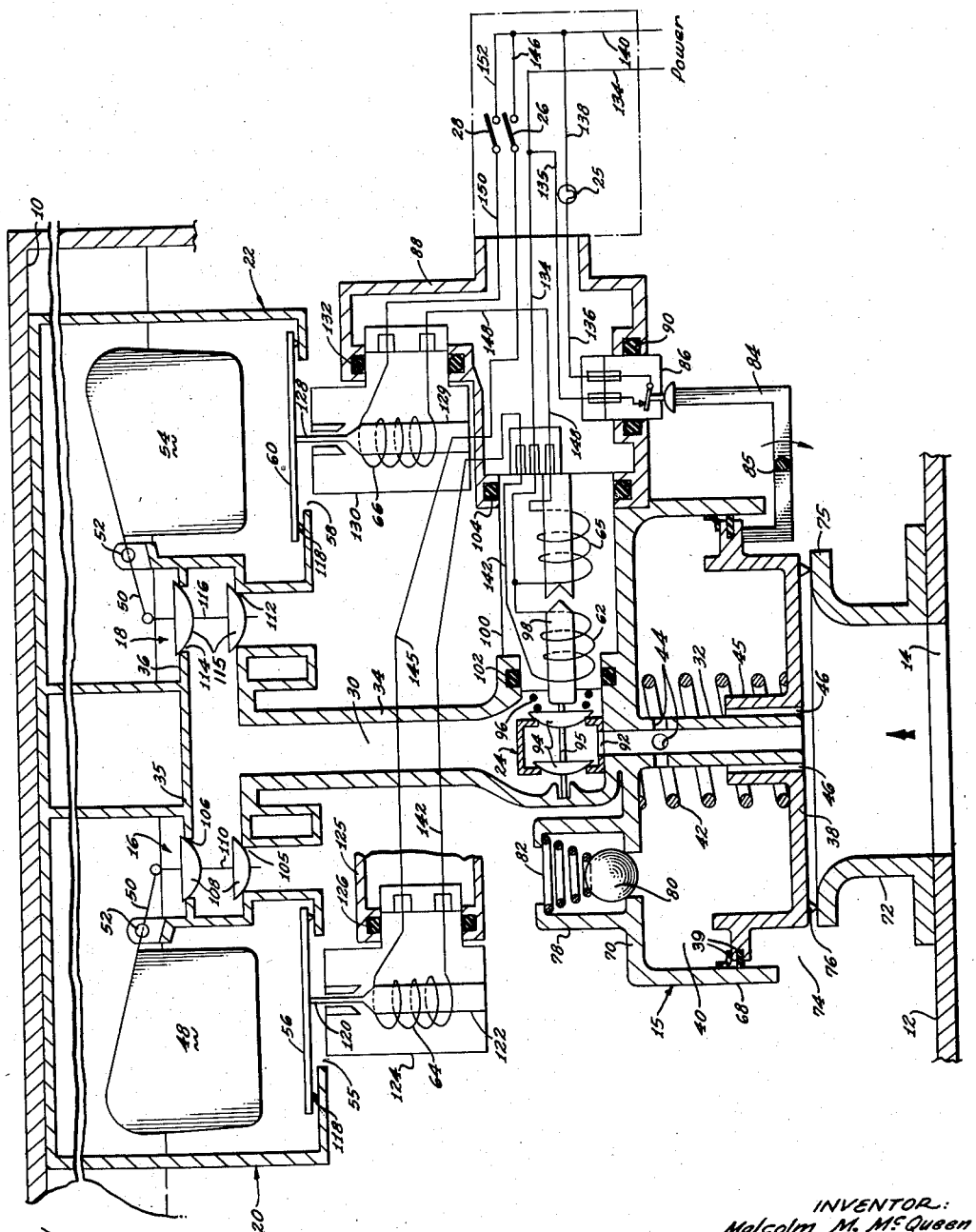
Figure 1 is a largely diagrammatic sectional view showing the first embodiment of the invention in its normal state between fueling operations.

In Figure 1, which illustrates a typical embodiment of the invention, the valve assembly is mounted in a fuel tank having a top wall 10 and a bottom wall 12 with a fuel inlet port 14 in the bottom wall. The principal parts of the valve assembly include: a main fuel valve, generally designated 15; a first pilot valve 16; a second pilot valve 18; a first trap 20 that is associated with the first pilot valve; a second trap 22 that is associated with the second pilot valve; a safety shut-off valve 24; a signal lamp 25 to indicate when the main valve 15 is closed; a first remotely controlled pre-check means operated by a first switch 26; and a second remotely controlled pre-check means operated by a second switch 28.

The safety shut-off valve 24 controls the flow of fluid through a diverter passage 30 that is formed, in part, by a downwardly extending tube 32 in the main valve 15 and, in part, by an upwardly extending conduit 34. The diverter passage 30 has one branch 35 leading to the first pilot valve 16 and a second branch 36 leading to the second pilot valve 18.

The main valve 15 has a valve member in the form of a piston 38 that carries a pair of sealing rings 39 and is a movable wall of a control chamber 40 and this valve member is urged downward towards its normal closed position by a coiled spring 42. It may be noted that the diverter passage 30 extends through the piston 38 to receive liquid fuel directly from the inlet port 14 of the fuel tank and that the tube 32 that forms part of the diverter passage has radial ports 44 that place the control chamber 40 in communication with the diverter passage and the inlet port 14. The piston 38 has an inner cylindrical portion 45 by means of which it is slidingly mounted on the tube 32 and this cylindrical portion may be formed with inner longitudinal grooves 46 for additional communication between the control chamber 40 and the inlet port 14.

When the main valve 15 is open during a fueling operation, a portion of the inflowing fuel from the inlet port 14 is diverted upwardly through the diverter passage 30 and through the two pilot valves 16 and 18 to an upper zone of the fuel tank, the safety shut-off valve 24 being open to permit the diversion flow. The diverter passage 30 and the two pilot valves 16 and 18 are so dimensioned that if either of the two pilot valves is closed the back pressure in the diverter passage 30 rises sufficiently to cause the main valve 15 to close. The back pressure is communicated to the control chamber 40 to close the main valve by fluid pressure against the upper side of the piston 38. If the safety shut-off valve 24 is closed the back pressure in the diverter passage 30 rises in the same manner to cause the main valve 15 to close.

A portion of the upwardly diverted fuel that is released by the first pilot valve 16 flows into the trap 20 and if the trap is closed a small body of fuel is formed therein to act on a float 48 that controls the first pilot valve. The float 48 is on one arm of an operating lever 50 that is mounted on a pivot 52, the second arm of the lever being pivotally connected to the pilot valve 16. In like manner, a portion of the upwardly diverted fuel that is released by the second pilot valve 18 flows into the second trap 22 and if the second trap is closed a second test body of fuel is formed to act on a float 54. The float 54 is on a second operating lever 50 that is mounted on a pivot 52 and is operatively connected to the second pilot valve 18.

The first trap 20 has a large opening 55 in its bottom that is normally closed by a dump valve 56 and, in like manner, the second trap 22 has a large opening 58 in its bottom that is controlled by a dump valve 60. The normally open switch 26 of the first pre-check means controls a first solenoid coil 62 of the safety shut-off valve 24 and a solenoid coil 64 of the first dump valve 56 so that closing the switch 26 causes both the safety shut-off valve 24 and the dump valve 56 to open. In like manner, the switch 28 of the second pre-check means controls a second solenoid coil 65 of the safety shut-off valve 24 and a solenoid coil 66 of the second dump valve 60 so that closing the second switch cuases the safety shut-off valve 24 and the second dump valve 60 to open.

*Structural details of the first embodiment of the invention*

In the first embodiment of the invention, the main valve 15 has a body comprising an upper cylinder 68 having an upper end wall 70 and further comprises a lower cylinder 72 of smaller diameter that is spaced from the upper cylinder to form an annular discharge port 74 for radial discharge of fuel into the bottom of the fuel tank. The lower cylinder 72 of the main valve is flared to form a valve seat 75 and the piston 38 is provided with valve ring 76 for sealing contact with the valve seat. Preferably the main valve 15 is provided with a suitable relief valve 78 in the upper end wall 70 in communication with the control chamber 40. The relief valve 78 comprises a ball 80 under pressure from a spring 82 and opens whenever the presure in the control chamber 40 rises excessively.

When the piston 38 is in its down or closed position it abuts one arm of an angular lever 84 that is mounted on a pivot 85 and the second arm of the lever presses against a switch 86 to energize the signal lamp 25. The switch 86 has a fluid-tight body which is mounted in an opening of an electrical receptacle 88 and is sealed therein in a fluid-tight manner by an O-ring 90. The electrical receptacle 88 is mounted in the side wall of the fuel tank in a fluid-tight manner.

The safety shut-off valve 24 has an inlet port 92 from the tube 32 and a pair of outlet ports that discharge into the conduit 34. The two outlet ports are controlled by a pair of valve members 94 on a valve stem 95, the two valve members being urged towards their normal closed positions by a suitable spring 96. The valve stem 95 is united with an armature 98 of a solenoid 100, and is controlled by the two previously mentioned solenoid coils 62 and 65. Energization of only one of the two coils 62 and 65 is sufficient to cause the safety shut-off valve 24 to open. One end of the body of the solenoid 100 extends into the diverted passage 30 and is sealed by an O-ring 102. The other end of the solenoid body extends into the previously mentioned electrical receptacle 88 and is sealed by an O-ring 104.

The first pilot valve 16 which is in constant communication with the diverter passage 30 has a lower outlet port 105 that discharges downward into the interior of the fuel tank and has an upper outlet port 106 that discharges into the first trap 20. These two outlet ports are controlled by a pair of valve members 108 on a valve stem 110 that is operatively connected to the previously mentioned float 48. In like manner, the second pilot valve 18 has two outlet ports 112 and 114 controlled by a pair of valve members 115, the two valve members being on a valve stem 116 that is operated by the second float 54.

The dump valve 56 of the first trap 20 comprises a disc having a valve ring 118 and is mounted on a valve stem 120. The valve stem 120 is unitary with an armature 122 of a solenoid 124 that has the previously mentioned solenoid coil 64. The body of the solenoid 124 is mounted in the end of an electrical conduit 125 and is sealed by an O-ring 126. The electrical conduit 125 is connected to the previously mentioned electrical receptacle 88.

In like manner, the second dump valve 60 of the second trap 22 comprises a disc having a valve ring 118, the disc being mounted on a valve stem 128 that is unitary with an armature 129 of a solenoid 130 that has the previously mentioned solenoid coil 66. The solenoid 130 is mounted in an opening in the electrical receptacle 88 and is sealed by an O-ring 132.

The electrical circuitry includes an input wire 134 that is connected to a suitable E. M. F. source. The wire 134 is connected to one side of each of the solenoid coils 62 and 65 of the safety shut-off valve 24 and is connected by a wire 135 to one side of the previously mentioned signal switch 86. The signal circuit is completed by a wire 136 from the second side of the switch 86 to one side of the signal lamp 25 and a wire 138 from the second side of the signal lamp to a return wire 140 that is in communication with the second side of the E. M. F. source.

The first remotely controlled pre-check circuit is completed by a wire 142 from the second side of the solenoid coil 62 to one side of the solenoid coil 64, a wire 145 from the second side of the solenoid coil 64 to one side of the previously mentioned pre-check switch 26 and a wire 146 from the second side of the pre-check switch to the return wire 140. The second pre-check circuit is completed by a wire 148 from the second side of the solenoid coil 65 to one side of the solenoid coil 66, a wire 150 from the second side of the solenoid coil 66 to one side of the previously mentioned pre-check switch 28, and a wire 152 from the second side of the pre-check switch to the return wire 140.

Operation

Between fueling operations the various moving parts are in their normal positions shown in Figure 1. Both of the pre-check switches 26 and 28 are open so that all of the four solenoid coils are de-energized. The main valve 15 is held in its closed position by the spring 42 and the safety shut-off valve 24 is held in its closed position by the spring 96.

At the end of a fueling operation the two dump valves 56 and 60 are closed and the two traps 20 and 22 usually contain bodies of the liquid fuel. Consequently the floats 48 and 54 may be elevated to close the two pilot valves 16 and 18 as shown in Figure 1. As the fuel level in the tank drops, however, the isolated fuel may drain out of the two traps and the two floats 48 and 54 drop down to open the pilot valves 16 and 18. Should pilot valves 16 and 18 open, the main valve 15 will be held closed against fuel pressure at port 14 by action of safety valve 24.

Since the main valve 15 is closed the switch 86 is closed to energize the signal lamp 25. If the pumping of the fuel to the engine or engines during flight creates fuel pressure at the tank inlet port 14, the main valve 15 remains closed because the fuel pressure is transmitted to the control chamber 40, and the area of the piston 38 that is exposed to pressure in the control chamber is larger than the area that is exposed to the fuel pressure on the underface of the piston, thus holding the main valve 15 closed.

Figure 2:
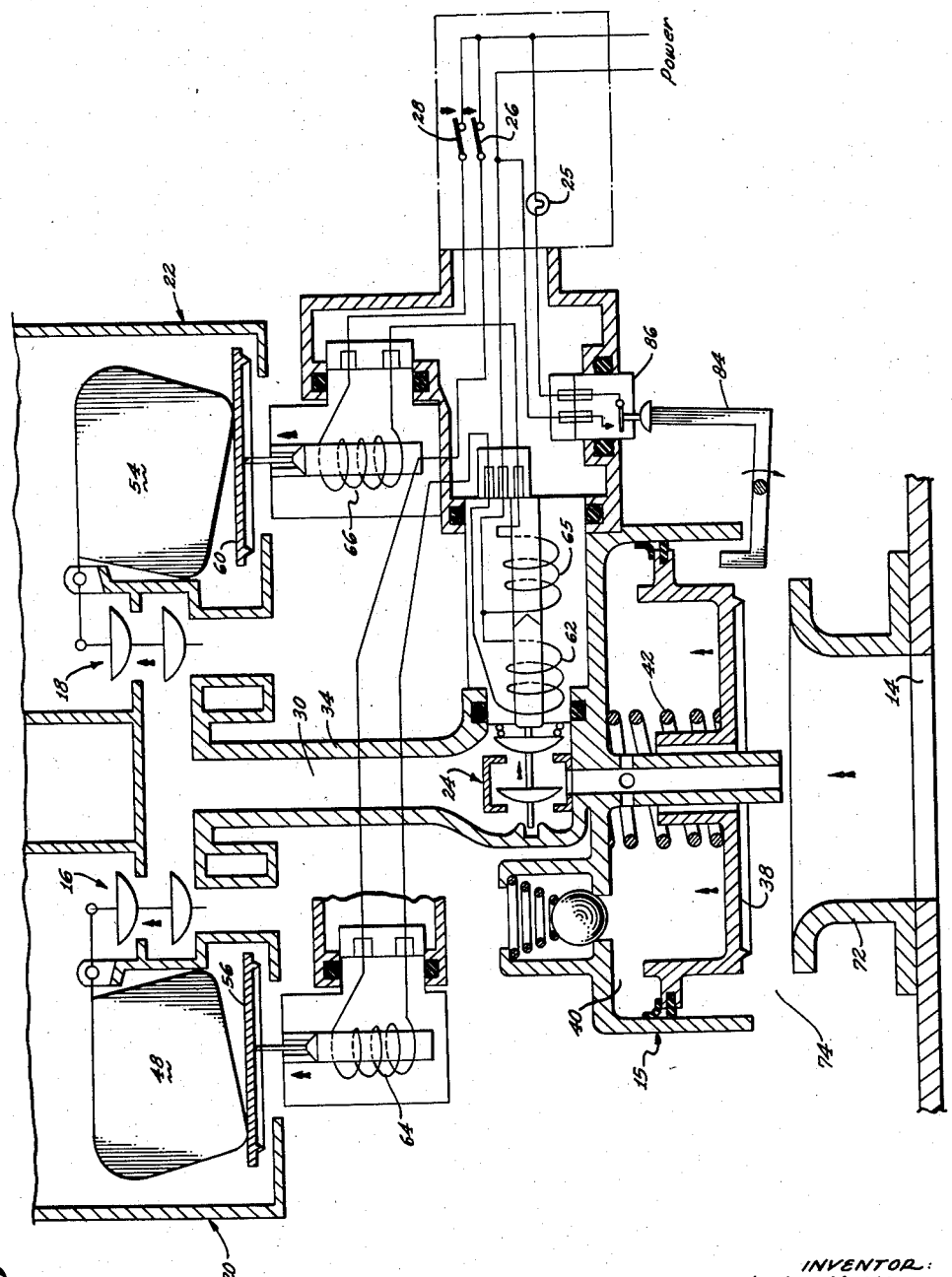
Figure 2 is a view similar to Figure 1 showing this embodiment of the invention with the movable parts in positions for a fueling operation.

To carry out a fueling operation the pressurized fuel supply is connected to the aircraft to create fuel pressure at the inlet port 14 of the fuel tank and then both of the pre-check switches 26 and 28 are closed to place the movable parts in the positions shown in Figure 2. The energization of the solenoids 64 and 66 opens the corresponding dump valves 56 and 60 to release any residual liquid fuel that may be in the two traps 20 and 22 and the two pilot valves 16 and 18 take their open positions.

The energization of the two solenoid coils 62 and 65 opens the safety shut-off switch 24 to permit fuel to flow from the tank inlet port 14 upward through the diverter passage 30 and the two pilot valves 16 and 18. A portion of the fuel discharged by each pilot valve drops directly into the interior of the fuel tank and another portion flows into the corresponding trap 20 or 22 for release from the trap by the corresponding dump valve 56 or 60. The drop in pressure in the control chamber 40 that results from opening of the diverter passage 30 results in the pressure on the underside of the piston 38 exceeding the pressure on the upper side with the result that the main valve 15 opens to admit fuel into the tank through the annular valve port 74. The raising of the piston 38 releases the angular lever 84 to permit the switch 86 to open for de-energization of the signal lamp 25.

Figure 3:
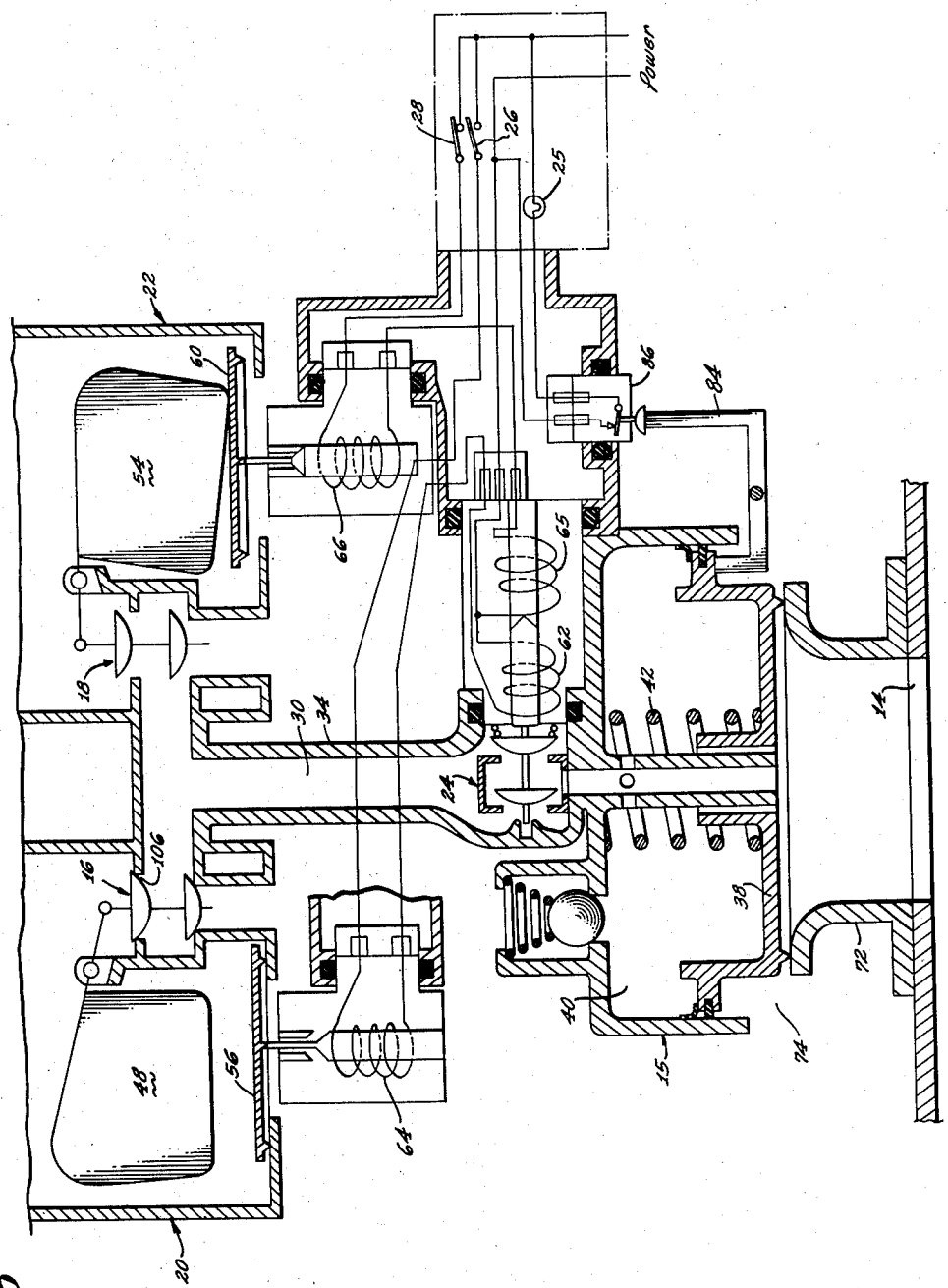
Figure 3 is a similar view showing the parts positioned for a pre-check operation to determine the operativeness of the valve assembly in the course of the refueling operation.

The first step in the pre-check operation that is carried out while the fuel tank is being filled, consists simply in opening the first pre-check switch 26 to cause the parts to take the positions shown in Figure 3. The opening of the pre-check switch 26 de-energizes the solenoid coil 64 to cause the dump valve 56 to close and also de-energizes the solenoid coil 62 of the safety shut-off valve 24, but the safety shut-off valve remains open because the second solenoid coil 65 remains energized.

The diverted fuel that is released through the upper port 106 of the first pilot valve 16 immediately fills the trap 20 because the dump valve 56 is closed and the rise of the liquid level in the trap lifts the float 48 to close the pilot valve. The closing of the first pilot valve 16 creates a rise in back pressure in the diverter passage 30 which is communicated to the control chamber 40 to cause the main valve 15 to close. The energization of the signal lamp 25 by the closing of the main valve 15 is assurance that both the first pilot valve 16 and the main valve 15 are in good working order.

The second step in the pre-check procedure is to close the first pre-check switch 26 and to open the second pre-check switch 28. The closing of the first pre-check switch 26 energizes the solenoid coil 64 to open the dump valve 56 so that the trap 20 empties promptly to permit the first pilot valve 16 to open. Opening of the second pre-check switch 28 de-energizes the solenoid coil 66 to close the dump valve 60 of the second trap 22 and the opening of the switch 28 also results in de-energization of the solenoid coil 65, but the safety shut-off valve 24 remains open because the alternate solenoid coil 62 is energized by action of closing switch 26. The closing of the dump valve 60 results in collection of the liquid fuel in the second trap 22 to lift the float 54 and thereby close the second pilot valve 18. The closing of the second pilot valve 18 while the first pilot valve 16 is open, creates a rise in back pressure in the diverter passage 30 to cause the main valve 15 to close in the manner heretofore described. The closing of the main valve 15 results in closing of the switch 86 to energize the signal lamp 25 to indicate that the second pilot valve 18 as well as the main valve 15 is functioning properly.

The second pre-check switch 28 is then closed again to dump the fuel in the second trap 22 to restore the parts to their positions for continuing the fueling operation as shown in Figure 2. The third step in the pre-check procedure may then be taken by opening both of the pre-check switches 26 and 28 simultaneously to observe how long it takes for the signal lamp 25 to be energized. If the safety shut-off valve 24 is in good working order, the de-energization of the two solenoid coils 62 and 65 simultaneously causes the safety shut-off valve 24 to close quickly with resultant rapid closing of the main valve 15 to light up the signal lamp 25. On the other hand, if the safety shut-off valve 24 fails to close, the energization of the signal lamp 25 is delayed until at least one of the two traps 20 and 22 has time to fill up with the diverted fuel to cause closing action of the corresponding pilot valve 16 or 18.

Figure 4:
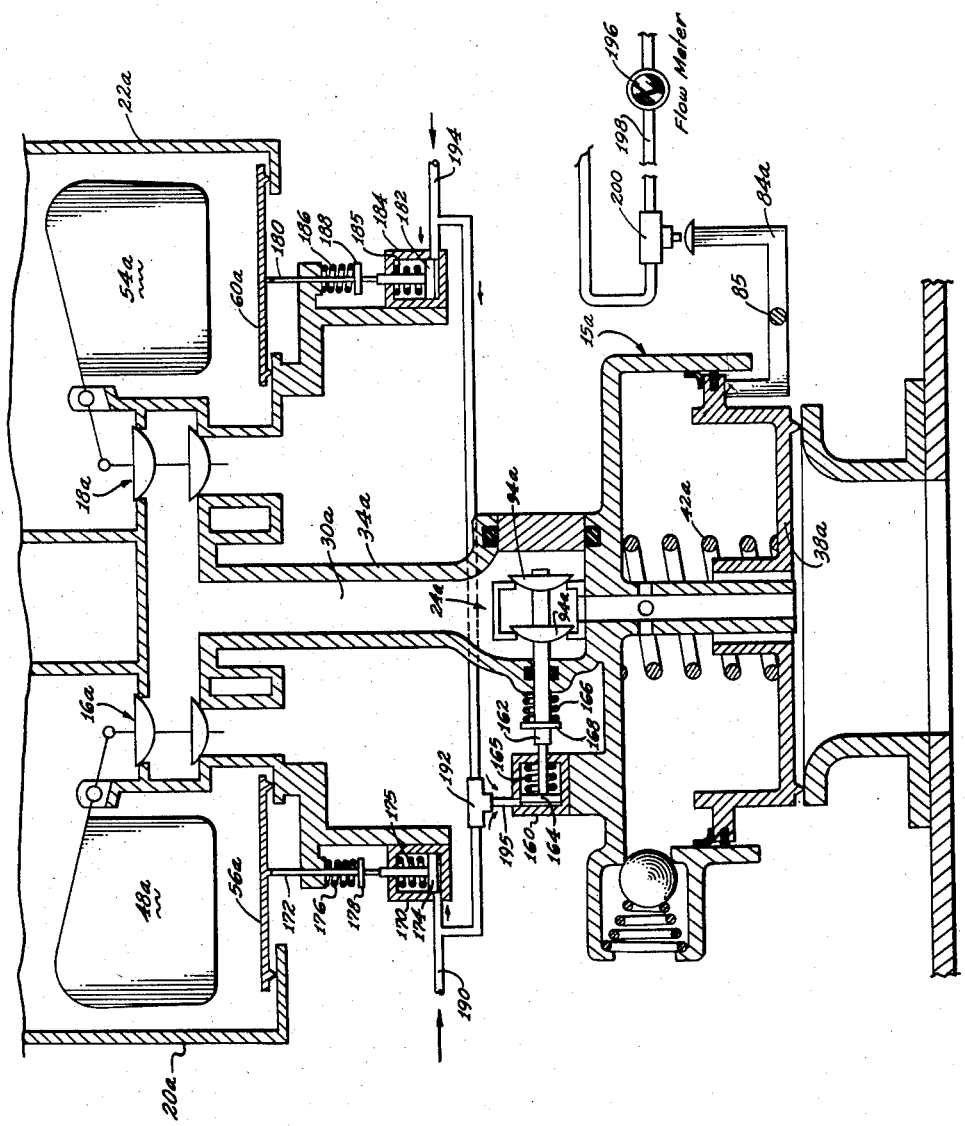
Figure 4 is a similar view of a second embodiment of the invention wherein two remotely controlled pre-check means are either pneumatic or hydraulic systems.

*The second embodiment of the invention shown in Figure 4*

The structure of the second embodiment of the invention is largely identical with the structure of the first embodiment, as indicated by the use of corresponding numerals to indicate corresponding parts. The differences arise from the fact that this embodiment of the invention is constructed for carrying out the pre-check steps by either pneumatic means or hydraulic means.

The safety shut-off valve 24a is controlled by a small power cylinder 160 and for this purpose the two valve members 94a are mounted on a valve stem 162 that is controlled by a piston 164 in the power cylinder. A spring 165 inside the power cylinder 160 acts on the piston 164 in a direction to close the safety shut-off valve and a second external spring 166 acting on a collar 168 of the valve stem 162 also urges the safety shut-off valve towards its normal closed position.

The dump valve 56a of the first trap 20a is controlled by a power cylinder 170 and for this purpose has a valve stem 172 that is connected with a piston 174 in the power cylinder. A spring 175 acting on the piston 174 and a second spring 176 acting on a collar 178 on the valve stem 172 cooperate to urge the dump valve 56a to closed position.

In like manner, the second dump valve 60a of the second trap 22a has a valve stem 180 that is connected to a piston 182 in a power cylinder 184, and a spring 185 acting on the piston 182 and a second spring 186 acting on a collar 188 of the valve stem 180 urge the second dump valve to its closed position.

A first pipe 190 from a source of gaseous or liquid fluid under pressure is connected to the power cylinder 170 and is also connected to one end of a shuttle valve 192. A second pipe 194 that is also connected to the high pressure source of gaseous or liquid fluid is connected to the power cylinder 184 and is connected to the second end of the shuttle valve 192. An intermediate lateral port of the shuttle valve 192 is connected by a short pipe 195 to the power cylinder 160 that controls the safety shut-off valve 24a.

The shuttle valve 192 is of a well known type having a fluid-pressure responsive piston which moves longitudinally in response to pressure differentials to close-off one or the other of the two end ports. Thus if the pipe 190 is under pressure from the fluid source but the pipe 194 is not, the shuttle valve places the pipe 190 in communication with the power cylinder 160 and cuts off communication between the power cylinder 160 and the pipe 194. On the other hand, if only the pipe 194 is under operating pressure the shuttle valve places the pipe 194 in communication with the power cylinder 160 and cuts the power cylinder 160 off from the pipe 190.

To carry out a fueling operation, both of the pipes 190 and 194 are placed under operating pressure to actuate the power cylinders 170 and 184 for opening the two dump valves 56a and 60a and the shuttle valve 192 places one of the two pipes in communication with the third power cylinder 160 to open the safety shut-off valve 24a. To carry out the first step in the pre-check operation, the pipe 190 is cut off from the high pressure source to function as a return line to permit the springs 176 and 175 to close the dump valve 56a. The maintenance of operating pressure in the pipe 194 keeps the second dump valve 60a open and also keeps the safety shut-off valve 24a open.

To carry out the second pre-check step, the pipe 190 is placed under operating pressure and the pipe 194 is released from pressure to serve as a return line to permit the springs 185 and 186 to close the second dump valve 60a. The operating pressure in the pipe 190 causes the dump valve 56a and the safety shut-off valve 24a to take open positions. The third step is to resume the fueling operation and then to cut-off the two pipes 190 and 194 from the pressure source simultaneously to check on the operativeness of the safety shut-off valve 24a.

A suitable means to indicate whether or not the valve 15a is open may comprise a flow meter 196 that is connected to the same high pressure fluid source by a pipe 198 having a shut-off valve 200. The shut-off valve 200 is spring-biased to take an open position but is normally closed by a previously described angular lever 84a when the main valve 15a is in its normal closed position.

Figure 5:
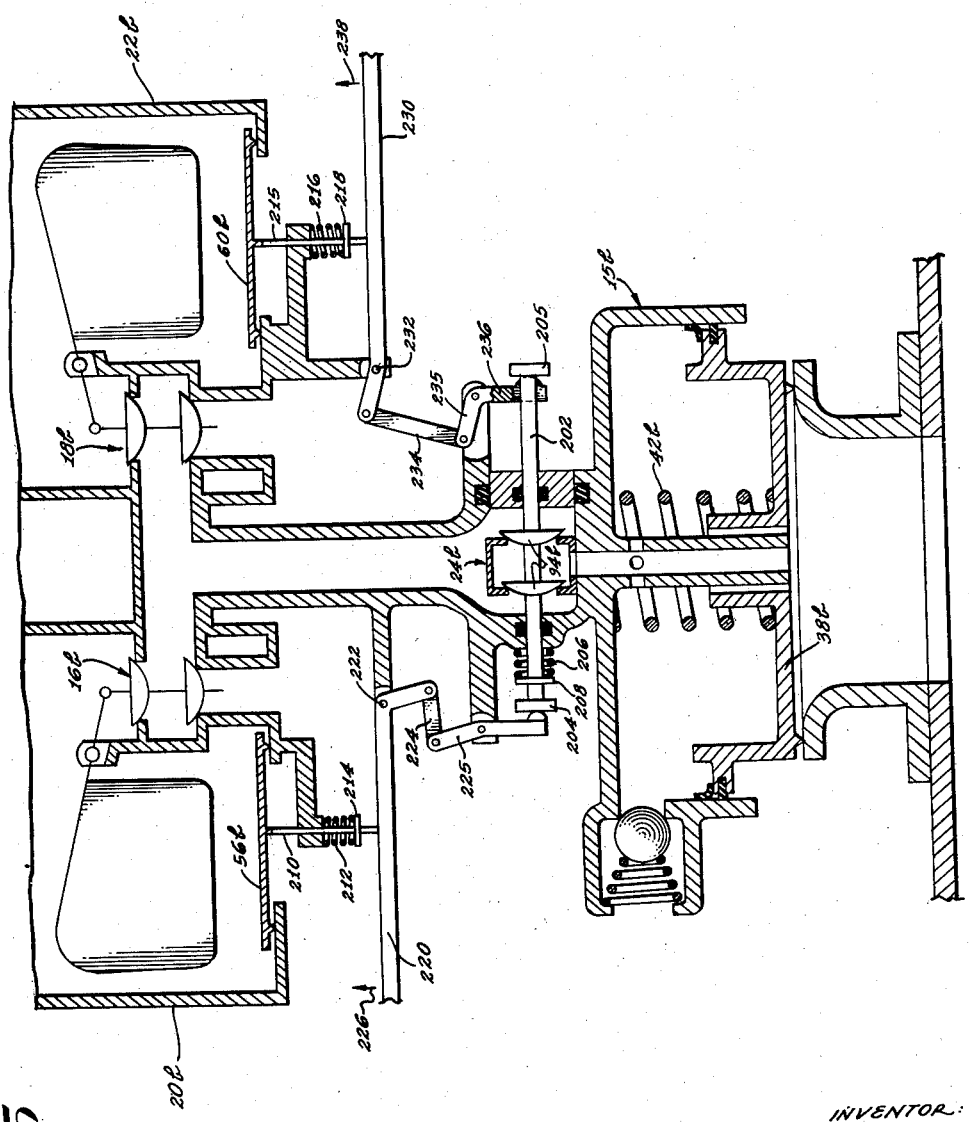
Figure 5 is a similar view showing a third embodiment of the invention wherein the two remotely controlled pre-check means are wholly mechanical mechanisms.

*The third embodiment of the invention illustrated by Figure 5*

The third embodiment of the invention is largely of the construction heretofore described, as indicated by the use of corresponding numerals to indicate corresponding parts. The differences arise from the fact that in this practice of the invention the pre-check mechanism is entirely mechanical.

The two valve members 94b of the safety shut-off valve 24b are mounted on a valve stem in the form of an operating rod 202 that has enlarged heads 204 and 205 on its opposite ends. A suitable spring 206 acting in compression against a collar 208 on the operating rod 202 normally holds the safety shut-off valve 24b in its closed position.

The dump valve 56b of the first trap 20b has a valve stem 210 and a spring 212 acts on a collar 214 on the valve stem to urge the dump valve towards its closed position. In like manner, the second dump valve 60b of the second trap 22b is mounted on a valve stem 215 and a spring 216 acts against a collar 218 on the valve stem to urge the dump valve towards its closed position.

A first manually operable pre-check lever 220 mounted on a pivot 222 is positioned with its longer arm adjacent the end of the valve stem 210 of the first dump valve 56b. The shorter arm of the pre-check lever 220 is connected by a link 224 to a rocker lever 225, the lower arm of which is positioned adjacent the head 204 at one end of the operating rod 202. When the pre-check lever 220 is swung upward as indicated by the arrow 226, the longer arm of the lever lifts the dump valve 56b to its open position and the rocker lever 225 forces the operating rod 202 to the right, as viewed in Figure 5, in opposition to the spring 206 to open the safety shut-off valve 24b.

A second pre-check lever 230 mounted on a pivot 232 has its longer arm adjacent the valve stem 215 of the second dump valve 60b. The shorter arm of the pre-check lever 230 is connected by a link 234 to a rocker lever 235 that acts against the second head 205 of the operating rod 202. The rocker lever 235 has a forked lower arm 236 that straddles the operating rod 202 to act against the inner face of the head 205. When the second pre-check lever 230 is swung upward as indicated by the arrow 238 it forces the dump valve 60b upward to its open position and causes the rocker lever 235 to force the operating rod 202 to the right, as viewed in Figure 5, in opposition to the spring 206 to open the safety shut-off valve 24b.

It is apparent that with the two pre-check levers in their normal inoperative positions shown in Figure 5, both pre-check levers may be operated to open the safety shut-off valve 24b and to open the two dump valves 56b and 60b for a fueling operation. Returning only the pre-check lever 220 to its shown position during the fueling operation provides a check on the operativeness of the first pilot valve 16b together with the main valve 15b and returning only the second pre-check lever 230 to its shown position during the fueling operation provides a check on the operativeness of the second pilot valve 18b and the main valve 15b. Thus the arrangement shown in Figure 5 provides for the same pre-check procedure as the earlier described embodiments of the invention. Whether or not the main valve 15b closes during the pre-check test may be ascertained either by ear or by observing a flow meter in the fuel supply line.

Figure 6:
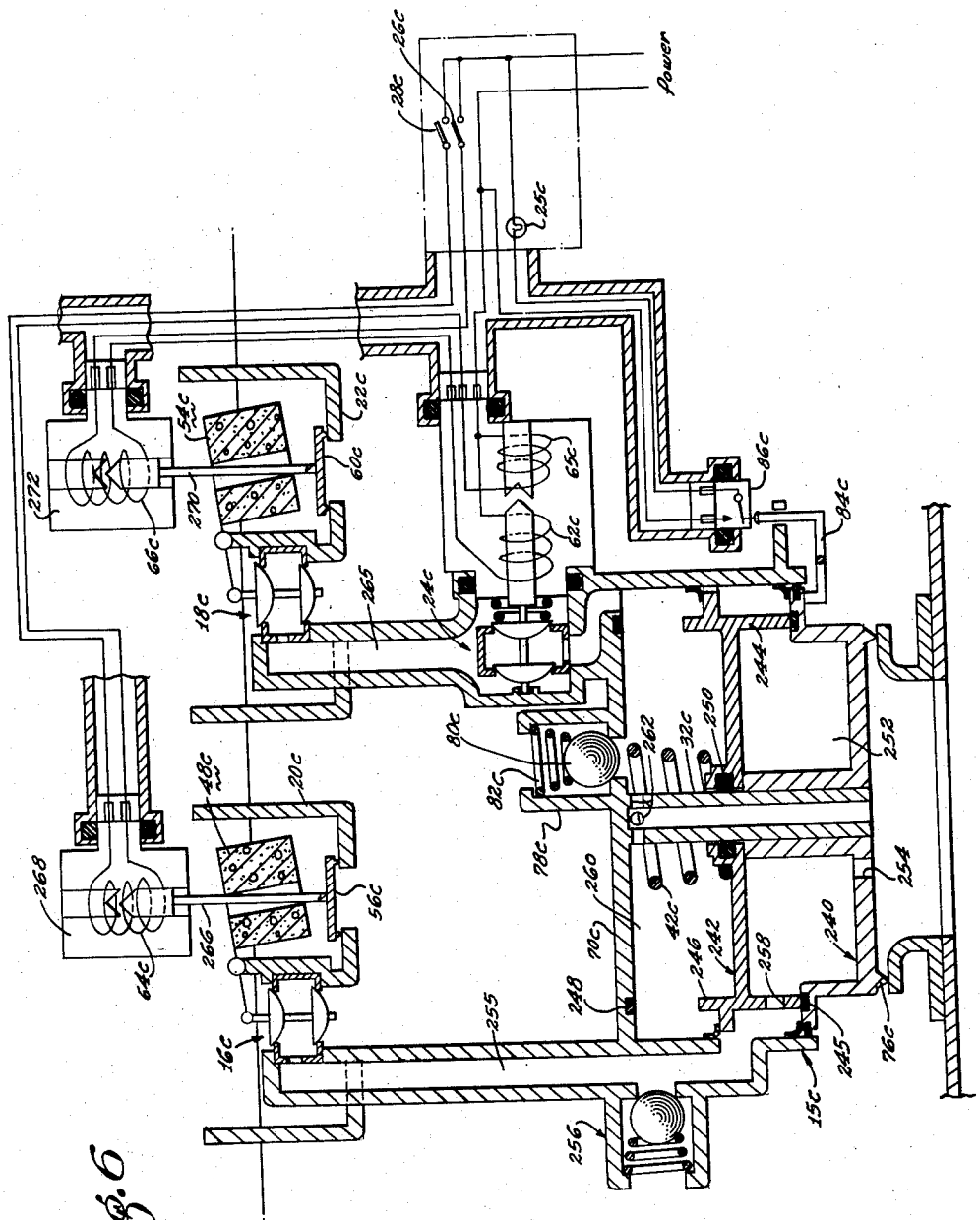
Figure 6 is a similar view illustrating a fourth embodiment of the invention.

*The fourth embodiment illustrated in Figure 6*

The fourth embodiment of the invention is largely similar to the first described embodiment as indicated by the use of corresponding numerals to indicate corresponding parts. The difference is that in this practice of the invention there are separate diverter passages for the two pilot valves respectively, instead of one diverter passage, and there are two corresponding control chambers in the main valve for response to back pressure in the two diverter passages respectively.

The main valve 15c in Figure 6 has a first piston 240 which carries a valve ring 76c and has a second piston 242 that has a downwardly extending skirt 244 for abutment against a sealing ring 245 that is carried by the first piston. The second piston 242 is also formed with an upwardly extending skirt 246 that cooperates with a sealing ring 248 in the upper end wall 70c of the main valve. Both of the pistons 240 and 242 slidingly embrace a downwardly extending tube 32c and the second piston 242 carries a sealing ring 250 that embraces the tube.

The lower piston 240 and the upper piston 242 cooperate to form a first control chamber 252 which is in communication with the inlet side of the main valve through an aperture 254 in the piston 240. The first control chamber 252 is in communication with a first diverter passage 255 that is provided with a relief valve 256 and the skirt 244 of the piston 242 is provided with an aperture 258 to maintain communication with the diverter passage when the two pistons are closed together.

The second piston 242 together with the upper end wall 70c forms a second control chamber 260 that is in communication with the inlet side of the main valve through radial apertures 262 in the downwardly extending tube 32c. The second control chamber 260 is in communication with a second diverter passage 265 which is provided with a safety shut-off valve 24c. The second control chamber 250 is further provided with a relief valve 78c having a ball 80c under pressure by a spring 82c.

The first pilot valve 16c is controlled by a float 82c, in the manner heretofore described but in this instance the float is of annular configuration and the dump valve 56c of the first trap 20c has a valve stem 266 that extends upwardly through the float. The stem 266 of the dump valve 56c is operated by a solenoid 268 having a solenoid coil 64c that may be energized to open the dump valve. In like manner, the second pilot valve 18c is controlled by an annular float 54c and a dump valve 60c has a valve stem 270 that extends upward through the float to a solenoid 272. The solenoid 272 has a solenoid coil 66c that may be energized to open the dump valve 60c.

The safety shut-off valve 24c is of the same construction as in the first embodiment of the invention and is controlled in the same manner. Thus the safety shut-off valve 24c is operatively connected to a solenoid having a first coil 62c and a second coil 65c, either of which coils may be energized to open the valve.

The wiring diagram is the same as in the first described embodiment of the invention and includes a switch 86c to control a signal lamp 25c and further includes a first pre-check switch 26c and a second pre-check switch 28c.

The spring 42c of the main valve urges the piston 242 downward against the piston 240 to urge the piston 240 to the normal closed position of the valve. When the safety shut-off valve 24c is open for a fueling operation, the pressure of the incoming fuel forces the two pistons 240 and 242 upward against the resistance of the spring 42c to admit fuel into the tank. Operating pressure does not build up in the first control chamber 252 because it is vented by the first diverter passage 255 and the second diverter passage 265 vents the second control chamber 260 to prevent build up of operating pressure therein.

If the pilot valve 16c closes the diverter passage 255, pressure builds up in the first control chamber 252 and forces the piston 240 downward to its closed position to cut off fuel flow. On the other hand, if the second pilot valve 18c closes the diverter passage 265 pressure rises in the second control chamber 260 and causes the piston 242 to move downward and force the piston 240 to its closed position to shut-off fuel flow.

It is apparent that the main valve 15c responds to closing of either of the two pilot valves 16c and 18c and it is further apparent that the pre-check switches 26c and 28c may be manipulated to carry out the same pre-check procedure as in the first described embodiment of the invention.

My description in specific detail of the selected practices of the invention will suggest various changes, substitutions and other departures from my disclosure within the spirit and scope of the appended claims.

I claim:

1. A valve assembly for controlling the flow of liquid from a pressurized supply into a tank, comprising: a normally closed main valve to control flow of the liquid into the tank; a first pilot valve and a second pilot valve both operative to close in response to rise of the liquid content of the tank to a predetermined level, said main valve being responsive to the pressure of the supply liquid to open when both of said pilot valves are open and being responsive to the two pilot valves individually to close in opposition to the supply pressure when either of the two pilot valves is closed; a first pre-check means operable to close said first pilot valve when the liquid content of the tank is below said predetermined level; a second pre-check means operable to close said second pilot valve when the liquid content of the tank is below said predetermined level; a normally closed safety shut-off valve to prevent fluid flow through said main valve; a first remote control means having a first operating position and a second operating position; means for coupling the first remote control means to the first pre-check means and to the safety shut-off valve to open the safety shut-off valve for the first operating position of the first remote control means and to operate said first pre-check means to close the first pilot valve for the second operating position of the first remote control means; a second remote control means having a first operating posititon and a second operating position; means for coupling the second remote control means to the second pre-check means and to the safety shut-off valve to open the safety shut-off valve for the first operating position of the second control means and to operate said second pre-check means to close the second pilot valve for the second operating position of the second remote control means, whereby both said remote control means may be operated to their first operating positions for a tank filling operation and the two remote control means may be operated alternately to their second operating positions during the filling operation to check on the operativeness of the valve assembly.

2. A valve assembly as set forth in claim 1 which includes means to indicate whether or not said main valve is closed.

3. A valve assembly as set forth in claim 1 in which said first remote control means comprises an electric circuit including electro-magnetic means to operate said first pre-check means and to open said safety shut-off valve; and in which said second remote control means comprises an electric circuit including electro-magnetic means to operate said second pre-check means and to open said safety shut-off valve.

4. A valve assembly as set forth in claim 1 in which said first and second remote control means are fluid-pressure-actuated.

5. A valve assembly as set forth in claim 1 in which said first and second remote control means are mechanical and are mechanically connected to said pre-check means and safety shut-off valve.

6. A valve assembly for controlling the flow of liquid from a pressurized supply into a tank, comprising: a normally closed main valve for liquid flow therethrough to form a main liquid body in the tank; a diverter passage means to divert a portion of the inflowing liquid to an upper zone of said tank; a first pilot valve having an open condition to release liquid from said diverter passage means at a first region in said upper zone and to close in response to the establishment of a liquid level in said upper zone at said region; a second pilot valve having an open condition to release liquid from said diverter passage means at a second region in said upper zone and to close in response to the establishment of a liquid level at said second region in said upper zone; a first trap to collect the diverted liquid released at said first region thereby to close said first pilot valve before the liquid content of the tank reaches said upper zone; a second trap to collect the diverted liquid released at said second region to create a liquid level to close said second pilot valve before the liquid content of the tank reaches said upper zone, said main valve being responsive to the pressure of the supply liquid to open when both of said pilot valves are open and being responsive to rise in pressure in said diverter passage means to close in opposition to the supply pressure when either of said two pilot valves is closed; a normally closed safety shut-off valve to prevent flow of liquid through said main valve; a first remote control means; and a second remote control means, one of said two traps and said safety shut-off valve being responsive to said first remote control means for the safety valve and said one of the two traps to open when said first remote control means is operated, the other of the two traps and said safety valve being responsive to said second remote control means for the safety valve and said other of the two traps to open when the second remote control means is operated.

7. A valve assembly as set forth in claim 6 which includes signal means to indicate when said main valve is closed.

8. A valve assembly as set forth in claim 6 in which said safety shut-off valve is in said diverter passage means to cause rise in pressure in the diverter passage means for closing action of the main valve.

9. A valve assembly as set forth in claim 6 in which said two remote control means comprise two electric circuits; and in which said circuits include electro-magnetic means to operate said two traps and said safety shut-off valve.

10. A valve assembly for controlling the flow of liquid from a pressurized supply into a tank, comprising: at least one pilot valve operative to close in response to rise of the liquid content of the tank to a predetermined level at an upper zone in the tank; a normally closed main valve for liquid flow therethrough into the tank to form a main liquid body in the tank, said main valve being responsive to the pressure of the supply liquid to open when said pilot valve is open and being responsive to closing of said pilot valve to close in opposition to the liquid pressure when said predetermined liquid level is reached; means to divert a portion of the inflowing liquid to said upper zone; and remotely controlled means to trap the diverted liquid in said upper zone to create a body of liquid at said predetermined level to close said pilot valve for closing action of the main valve to pre-check the operativeness of the valve assembly before the main body of liquid reaches said predetermined level.

11. A valve assembly for controlling the flow of liquid from a pressurized supply into a tank, comprising: a normally closed main valve for liquid flow therethrough to form a main liquid body in said tank; a diverter passage to divert a portion of the inflowing liquid to an upper zone of said tank; at least one pilot valve to close said diverter passage in response to the establishment of a liquid level at said upper zone of the tank thereby to raise the pressure in said diverter passage, said main valve being responsive to the supply pressure to open when the pressure in said diverter passage is relatively low and being responsive to rise in pressure in said diverter passage to close in opposition to the supply pressure whereby the main valve closes automatically in response to closing of said pilot valve when the main body of liquid reaches said level; and remotely controlled means to trap a portion of the diverted liquid to create a body of liquid at said level for pre-checking the operativeness of the valve assembly before the main body of liquid reaches said level.

12. A valve assembly as set forth in claim 11 which includes a remotely controlled normally closed safety shut-off valve to close said diverter passage thereby to cause said main valve to close.

13. A valve assembly as set forth in claim 11 which includes signal means to indicate when said main valve is closed.

14. A valve assembly as set forth in claim 11 which includes two pilot valves both of which are connected to said diverter passage to release liquid therefrom; and in which said main valve closes in response to the rise in pressure in said diverter passage that results from the closing of only one of said two pilot valves.

15. A valve assembly for controlling the flow of liquid from a pressurized supply into a tank, comprising: a normally closed main valve for liquid flow therethrough to form a main liquid body in said tank; means to release liquid at an upper zone of said tank; a first pilot valve and a second pilot valve operative to close in response to the establishment of a liquid level in two respective regions in said upper zone, said main valve being responsive to the pressure of the supply liquid to open when both of said pilot valves are open and being responsive to the two pilot valves individually to close in opposition to the supply pressure when either of the pilot valves is closed; a first means to trap a portion of the released liquid in the region of said first pilot valve to cause closing thereof before the main body of liquid reaches the upper zone of the tank; a second means to trap a portion of the released liquid in the region of said second pilot valve to cause closing thereof before the main liquid body reaches the upper zone of the tank; safety means normally preventing opening of said main valve and being operative to permit the main valve to open; a first remote control means to operate both said first trap means and said safety means and a second remote control means to operate both said second trap means and said safety means.

16. A valve assembly for controlling the flow of liquid from a pressurized supply into a tank, comprising: a normally closed main valve for liquid flow therethrough to form a main liquid body in said tank; means to release liquid at an upper zone of said tank; a pilot valve operative to close in response to the establishment of a liquid level at said upper zone, said main valve being responsive to the supply pressure to open when said pilot valve is open and being responsive to closing of the pilot valve to close in opposition to the supply pressure; a trap to collect the released liquid in said upper zone thereby to close said pilot valve and to open to permit the released liquid to flow therethrough; a normally closed safety valve to prevent liquid flow through said main valve; remotely controlled means to open said safety valve to permit the tank to be filled through said main valve; and remotely controlled means to control said trap.

17. A valve assembly for controlling the flow of liquid from a pressurized supply into a tank, comprising: a normally closed main valve for liquid flow therethrough to form a main liquid body in said tank; a first diverter passage and a second diverter passage to divert portions of the inflowing liquid to an upper zone of the tank; a first pilot valve and a second pilot valve to release liquid from said two diverter passages respectively at said upper zone, said pilot valves being operative to close in response to the establishment of liquid levels at a first region and a second region respectively in said upper zone; a first trap means operable to collect the diverted liquid at said first region to cause closing of said first pilot valve independently of the level of the main liquid body in said tank; a second trap means operable to collect the diverted liquid at said second region to cause closing of said second pilot valve independently of the liquid level of the main body of liquid; a first means to close said main valve in response to rise in pressure in said first diverter passage when said first pilot valve closes; a second means to close said main valve in response to rise in pressure in said diverter passage when said second pilot valve closes; a normally closed safety valve controlling flow through one of said diverter passages to prevent operation of said main valve between filling operations; a first remote control means to open said safety valve and operate one of said two trap means; and a second remote control means to open said safety valve and operate the other of said two trap means.

18. A valve assembly as set forth in claim 17 which includes signal means to indicate when said main valve is closed.

19. A valve assembly as set forth in claim 17 in which said first remote control means comprises an electric circuit that includes electro-magnetic means to open said safety valve and operate one of said trap means; and in which said second remote control means comprises an electric circuit including electro-magnetic means to open said safety valve and operate the other of the two trap means.

References Cited in the file of this patent

UNITED STATES PATENTS

| | | |
|---|---|---|
| 757,903 | Ford | Apr. 19, 1904 |
| 993,628 | Williams | May 30, 1911 |
| 2,780,236 | Russell | Feb. 5, 1957 |

Disclaimer 2,871,873.—*Malcolm M. McQueen*, Hollywood, Calif. LIQUID LEVEL CONTROL VALVE WITH PRE-CHECK SYSTEM. Patent dated Feb. 3, 1959. Disclaimer filed Apr. 19, 1963, by the assignee, *Telecomputing Corporation*.

Hereby enters this disclaimer to claims 10, 11, 12, 13, 14 and 16 of said patent.

[*Official Gazette June 18, 1963.*]